United States Patent Office 3,476,834
Patented Nov. 4, 1969

3,476,834
β-PHOSPHONYLVINYL PHOSPHATES
Bernard Miller, Princeton, and Howard Margulies, Princeton Junction, N.J., assignors to American Cyanamid Company, Stamford, Conn., a corporation of Maine
No Drawing. Filed Feb. 2, 1966, Ser. No. 524,457
Int. Cl. C07f 9/40, 9/24, 9/16
U.S. Cl. 260—931                                    6 Claims

ABSTRACT OF THE DISCLOSURE

There is provided an insecticidal compound of the formula:

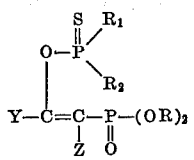

wherein R is (lower)alkyl or allyl; $R_1$ and $R_2$ are each a (lower)alkoxy or a -N(di(lower)alkyl) substituent; Y is methyl or phenyl; and Z represents hydrogen or (lower)alkyl, said compound being prepared by reacting a phosphorochloridothioate and β-ketopropylphosphonate.

---

The present invention relates to novel β-phosphonylvinyl thiophosphates, to a method for the preparation of the same and has as its principal object their use as pesticides. More particularly, the invention relates to a class of novel compounds of the formula:

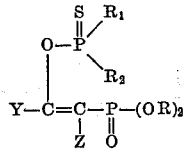

wherein R represents a lower alkyl or allyl group; $R_1$ and $R_2$ are each either (lower)alkoxy or

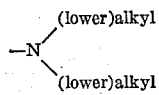

Z is hydrogen, alkyl or halogen and Y is alkyl or aryl.

Compounds which fall within the invention's purview are illustrated as follows:

O-[2-(dimethoxyphosphinyl)-1-methylvinyl] O,O-diethyl phosphorothioate,
O-[2-(diethoxyphosphinyl)-1-methylvinyl] O,O-diethyl phosphorothioate,
O-[2-(diethoxyphosphinyl)-1-methylpropenyl] O,O-diethyl phosphorothioate,
O-[2-(dimethoxyphosphinyl)-1-methylvinyl] O-ethyl N,N-dimethylphosphoramidothioate,
O-[2-(diethoxyphosphinyl)-1-methylvinyl] O,O-dimethyl phosphorothioate,
O-[2-(dimethoxyphosphinyl)-1-methylvinyl] O,O-dimethyl phosphorothioate,
O-[2-(diethoxyphosphinyl)-1-phenylvinyl] O,O-diethyl phosphorothioate, and
O-[2-(diallyloxyphosphinyl)-1-methylvinyl] O,O-dimethyl phosphorothioate.

In brief, the process of the invention involves the reaction in equimolar proportions of (a) a thiophosphoryl halide of the formula:

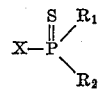

where $R_1$ and $R_2$ are each either (lower)alkoxy and

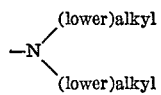

of from 1 to 4 carbon atoms and X is a halogen with (b) a β-keto phosphonate compound of the formula:

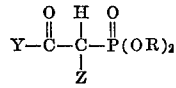

wherein R is lower alkyl or allyl; Y is lower alkyl or aryl; and Z is hydrogen, halogen or (lower)alkyl, said halogen substituent being fluorine, chlorine, bromine or iodine.

In the process of the present invention, the particular solvent medium in which the reaction is to be carried out can vary widely. For instance, solvents, such as tert-butanol, benzene, acetone, methylisobutylketone and even water, may be employed. If the process is carried out in the presence of an organic solvent, resultant reaction mixture is preferably poured into water, then extracted with a solvent, such as methylene chloride. The solvent is next evaporated from the extracted product. Where water per se is employed as the reaction medium, the crude water-insoluble product can be separated from the aqueous medium, thereby eliminating the use of any organic solvent.

The invention will be better understood by referring to the examples, provided below, which are to be taken as merely illustrative and not by way of limitation. Unless otherwise specified, the parts are by weight.

EXAMPLE 1

Preparation of O-[2-(dimethoxyphosphinyl)-1-methylvinyl] O,O-diethyl phosphorothioate To a solution of 4.0 grams potassium t-butoxide and 5.8 grams dimethyl β-ketopropylphosphonate were added 6.6 grams of O,O-diethylphosphorochloridothioate. The mixture was refluxed for one hour and then poured into water, extracted with methylene chloride, the extract dried over magnesium sulfate and the solvent evaporated to yield 10.0 grams of crude liquid. This was chromatographed on magnesium silicate to yield 4.0 grams (36%) of pure product as a colorless fluid having the analysis:

Calcd. for $C_9H_{20}P_2SO_6$: C, 33.9; H, 6.32; S, 10.0; P, 19.42. Found: C, 34.25; H, 6.31; S, 9.50; P, 18.86.

EXAMPLE 2

Preparation of O-[2-(diethoxyphosphinyl)-1-methylvinyl] O,O-diethyl phosphorothioate To a solution of 4.0 grams of potassium butoxide and 7.0 grams of diethyl β-ketopropylphosphonate were added 6.8 grams of diethylphosphorochloridothioate in 250 ml. of t-butanol. The mixture was refluxed for eight hours and then poured into water, extracted with methylene chloride and the extract dried over magnesium sulfate. The solvent was evaporated; the remaining residue run through a layer of "Florisil" brand magnesium silicate with petroleum ether. Three grams of resultant oily product were recovered and subjected to microanalysis as follows:

Calcd. for $C_{11}H_{24}O_6P_2S$: C, 38.2; H, 6.98; S, 9.25; P, 17.88. Found: C, 37.98; H, 7.12; S, 9.23; P, 12.80.

EXAMPLE 3

Preparation of O-[2-(diethoxyphosphinyl)-1-methylpropenyl] O,O-diethyl phosphorothioate To a solution of 5.7 grams of potassium butoxide and 9.65 grams of diethylphosphorochloridothioate were added 10.6 grams of diethyl α-methyl-β-ketopropylphosphonate in 200 ml. of tert-butanol. The mixture was refluxed for three hours and 10% excess (0.6 gram) of potassium butoxide added to react with any unreacted starting materials. The residue was mixed with petroleum ether and chromatographed on a column of neutral alumina. Thirteen grams of product were recovered. This was dissolved in hexane, filtered, and the solvent evaporated to yield a product of the following analysis:

Calcd. for $C_{12}H_{26}O_6P_2S$: C, 40.0; H, 7.27; S, 8.90; P, 17.18. Found: C, 39.34; H, 7.66; S, 10.57; P, 16.58.

EXAMPLE 4

Preparation of O-[2-(dimethoxyphosphinyl)-1-methylvinyl] O-ethyl N,N-dimethylphosphoramidothioate To a solution of 14.0 grams of dimethyl β-ketopropylphosphonate and 9.5 grams of potassium t-butoxide in 200 ml. of t-butanol were added 16.0 grams of O-ethyl N,N - dimethylphosphorochloridoamidothioate and the mixture stirred at room temperature for four hours, then refluxed for eight hours. The mixture was poured into water, extracted with methylene chloride, dried over magnesium sulfate and the solvent evaporated to give 17 grams of liquid. This was chromatographed on a column of "Florisil" brand magnesium silicate with petroleum ether. The elemental analysis of the recovered product was as follows:

Calcd. for $C_9H_{21}P_2SNO_5$: C, 34.1; H, 6.65; N, 4.42; S, 10.1; P, 19.6. Found: C, 34.98; H, 7.01; N, 4.45; S, 9.97; P, 19.18.

EXAMPLE 5

Preparation of O-[2-(diethoxyphosphinyl)-1-methylvinyl] O,O-dimethyl phosphorothioate To a solution of 5.9 grams of diethyl β-ketopropylphosphonate, 5.7 grams potassium butoxide and 7.0 ml. of t-butanol was added 4.8 grams dimethyl phosphorochloridothioate. The mixture was permitted to stand overnight. The solution was then poured into water, extracted with methylene chloride, the extract dried over magnesium sulfate and the solvent evaporated. 10.0 grams of yellow oil was recovered and run through a small pad of "Florisil" brand magnesium silicate with petroleum ether. Resultant product recovered in a yield equal to 2.5 grams was subjected to elemental analysis as follows:

Calcd. for $C_9H_{20}O_6P_2S$: C, 33.9; H, 6.32; S, 10.0; P, 19.42. Found: C, 31.44; H, 6.34; S, 10.64; P, 19.83.

EXAMPLE 6

Preparation of O-[2-(dimethoxyphosphinyl)-1-methylvinyl] O,O-dimethyl phosphorothioate To a stirred solution of 5.6 grams potassium t-butoxide and 8.3 grams dimethyl β-ketopropylphosphonate was added 8.0 grams dimethyl phosphorochloridothioate. The mixture was permitted to stand overnight at room temperature, then poured into water, extracted with methylene chloride, the extract dried and the solvent evaporated under vacuum to give 9.6 grams of product, which analyzed as follows:

Calcd. for $C_7H_{16}P_2SO_6$: C, 28.76; H, 5.52; S, 10.95; P, 21.2. Found: C, 28.03; H, 5.59; S, 10.64; P, 20.59.

EXAMPLE 7

Following the procedure of Example I in every respect except that either (a) diethyl-β-keto-β-phenylethyl phosphonate or (b) diallyl-β-ketopropylphosphonate and (a) diethyl phosphorochloridothioate or (b) dimethyl phosphorochloridothioate are substituted for dimethyl β-ketopropylphosphonate and diethyl phosphorochloridothioate, respectively, the following identified compounds are thereby prepared:

(A) O-[2-(diethoxyphosphinyl)-1-phenylvinyl] O,O-diethyl phosphorothioate having the structure

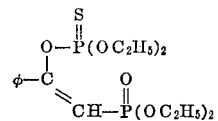

having the analysis:

Calcd. for $C_{16}H_{26}O_6P_2S$: C, 47.1; H, 6.42; P, 15.18; S, 7.84. Found: C, 43.68; H, 6.42; P, 14.10; S, 7.49.

and (B) O-[2-(diallyloxyphosphinyl)-1-methylvinyl] O,O-dimethyl phosphorothioate having the structure

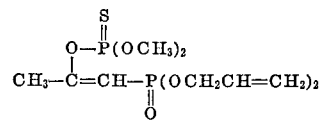

having the analysis as follows:

Calcd. for $C_{11}H_{20}SP_2O$ : C, 38.6; H, 5.88; S, 9.36; P, 18.05. Found: C, 39.75; H, 6.32; S, 8.80; P, 16.87.

The following examples illustrate the pesticidal effectiveness of the compounds of the present invention. In each table below, the percentages of the test compounds as well as p.p.m. represent the concentrations employed.

EXAMPLE 8

Control of southern armyworms (*Prodenia eridania* Cram.) is demonstrated by the following tests wherein the compounds are individually prepared as .1% solutions of test compound in 65% acetone and 35% water mixture. Sieva lima bean plants are dipped in the test solutions and set in the hood to dry. When dry, they are placed in four-inch petri dishes on a moist filter paper and ten third-instar larvae are added to each test. The tests are covered and maintained at about 80° F., 60% R.H. for two days. Following the holding period, mortality counts are made and estimates of amount of feeding observed and recorded. From the data provided and summarized in the Table I below, it is evident that the compounds are highly effective for controlling armyworms.

EXAMPLE 9

Control of nasturtium aphids (*Aphis rumicis* L.) with the compounds of the instant invention is clearly demonstrated by the following tests wherein .1% and .01% solutions of each test compound are prepared in 65% acetone and 35% water. Small pots containing nasturtium plants approximately two inches tall and infested two days before are selected for testing. These pots are placed on a turntable and sprayed with the test solution to effect essentially complete coverage of the aphids and plants. The sprayed plants are then placed on their sides in white enamel trays which have their edges coated with oil as a barrier and placed in a constant temperature and humidity room which is maintained at about 70° F., 50% R.H. After two days holding time, the plants are examined and mortality estimates made. From the results of these tests, it can be seen that 95% to 100% control of aphids is achieved with the compounds of the instant invention at both the .1% and .01% solutions, in Table II below.

EXAMPLE 10

The miticidal activity of the compounds of the instant invention is demonstrated by the following tests wherein Sieva lima bean plants with the first pair of leaves three to four inches in size are infested about 5 hours before testing using about 200 adult mites per leaf. The infested leaves are dipped in test solutions made up as 0.1 and .001% of active ingredient in 65% acetone/35% water. After the leaves are dipped, they are placed in a hood to dry and when dry held for two days in a constant temperature and humidity room at 80° F., 60% R.H. Following the two-day holding period, the adult mite mortality count is determined by examining the plants under a 10X binocular-scope. The results of the test are provided in Table III below.

EXAMPLE 11

Control of the confused flour bettle (*Tribolium confusum* Duv.), the large milkweed bug (*Oncopeltus fasciatus* Dall.) and the German cockroach (*Blattella germanica* L.) is demonstrated by tests wherein 1% dusts are lightly sprinkled on the bottoms of petri dishes and approximately 20 adult insects of each species named placed in said individual petri dishes. The dishes are covered with screens, placed in a room at a constant temperature of 80° F. and 60% R.H., and held there for three days. After three days mortality counts are made. The results of these tests are provided in Table IV below.

EXAMPLE 12

The systemic activity of the compounds of the instant invention is demonstrated by the following tests wherein the individual compounds were prepared as 10 p.p.m. and 100 p.p.m. emulsions in acetone and water. These emulsions were placed in separate 2-ounce bottles and Sieva lima bean plants with only the primary leaves and foliage were cut off just above soil level and inserted in the bottles containing the test solutions. The bottles were then placed in ventilated boxes with the leaves extending outside such that fumes from the compounds are drawn out of the boxes rather than rising to affect the test leaves. About 50 adult mites were placed on each leaf and permitted to remain there for three days. Following the holding period, the leaves were examined and the mortality counts made. The systemic activity of the compounds is shown by the results of these tests provided in Table V below.

EXAMPLE 13

The systemic activity of the compounds of the instant invention for controlling southern armyworms is demonstrated by the following tests using 100 p.p.m. emulsions prepared as in the example above. As in the previous example, Sieva lima bean plants cut off just above the soil line are inserted in the bottles containing test emulsion and permitted to remain there for three days. The bottles are then placed in boxes and fumes withdrawn from the box in order that they do not contact the leaves. The bottles are permitted to remain in the boxes for three days, then removed and the leaves from said plants placed in petri dishes on a moist filter paper. Ten third-instart southern armyworm larvae are then added to each test and permitted to remain there for an additional three days. At the end of this time the dishes are examined and the mortality count made. Systemic control of southern armyworm with the compounds of the instant invention is evidenced by the results of these tests provided in Table VI below.

EXAMPLE 14

Mosquito larvae (*Anopheles quadrimaculatus* Say) control of the compounds of the instant invention is shown by the following tests wherein groups of 25 larvae of the common malaria mosquito are transferred with a medicine dropper to a 50 ml. beaker containing 25 ml. of water. The test compound is formulated as an emulsion containing 0.1 gram of test material, 0.2 gram of Alrodyne 315 emulsifier, 10 ml. of acetone and 90 ml. of water. This 1000 p.p.m. emulsion is diluted ten-fold with 65% acetone/35% water to give 100 p.p.m. One milliliter of the 100 p.p.m. emulsion is pipetted into 225 ml. of water in a 400 ml. beaker and stirred vigorously. The larvae in 25 ml. of water are added, giving a concentration of 0.4 p.p.m. Mortality counts are made after 24 hours at 80° F. and the results recorded in Table VII.

EXAMPLE 15

Control of house flies (*Musca domestica* L.) with the compounds of the instant invention is evidenced from the following tests wherein 100% control is achieved with 50 p.p.m. of test compound. The test employed is as follows:

Groups of 25 adult female house flies are lightly anesthetized with $CO_2$, placed in wide-mouth pint mason jars, and covered with a screen cap. The test compound is formulated as an emulsion containing 0.1 gram of test material, 0.2 gram of Alrodyne 315 emulsifier, 10 ml. of acetone and 90 ml. of water. Two milliliters of this emulsion are diluted to 40 ml. with 10% sugar solution in a 10-dram glass vial, giving a concentration of 50 p.p.m. The mouth of the vital is covered with a single layer of cheesecloth, inverted and placed on the screen cap, so that the flies can feed on the solution through the screen. Mortality counts are made after two days at 80° F. Compounds killing more than 75% of the flies at 50 p.p.m. are further tested at 5 p.p.m. The results are recorded in Table VIII below.

EXAMPLE 16

Control of southern corn rootworm (*Diabrotica undecimpunctata howardi* Barber) with the compounds of the instant invention is demonstrated by the following test wherein 50 mg. of the compound to be tested is dissolved in 2 ml. of a suitable solvent and pipetted over the surface of one quart of sandy loam soil in a gallon stainless steel container. This is then thoroughly mixed on a mechanical tumbler for thirty revolutions, giving an initial screening dose equivalent to fifty pounds per acre (25 p.p.m. in the soil). Approximately 25 ml. of this treated soil is placed in a 125 ml. test tube and ten rootworm larvae, seven to nine days old, are added to each tube. The tubes are capped with culture tube closures to allow gas exchange, and held for six days at 80° F. and 60% R.H. Mortality counts are made by washing in a twenty-mesh sieve, floating off live larvae from the soil. The results are recorded in Table IX below.

TABLE

| Structure of Test Compound | I Armyworms 0.1% | II Aphids 0.1% | II Aphids 0.01% | III Mites .01% | III Mites .001% | IV TC 1% | IV MB 1% | IV GC 1% | V Mite Systemic p.p.m. 100 | V Mite Systemic p.p.m. 10 | VI Army worms Systemic p.p.m. 100 | VII Mosquito p.p.m. 0.4 | VIII Fly p.p.m. 50 | VIII Fly p.p.m. 5 | IX Rootworm, lbs./acre 50 |
|---|---|---|---|---|---|---|---|---|---|---|---|---|---|---|---|
| | | | | | | | | | Percent Mortality | | | | | | |
| (C₂H₅O)₂P(S)—O—C(CH₃)=CH—P(O)(OC₂H₅)₂ | 100 | 100 | 95 | 100 | 85 | 0 | 85 | 60 | 100 / 85 | 100 / 84 | | 96 | 100 | 28 | 100 |
| (C₂H₅O)₂P(S)—O—C(CH₃)=CH—P(O)(OC₂H₅)₂ with CH₃ | 100 | 99 | 15 | 88 | 80 | 0 | 80 | 0 | 97 | 0 | | 100 | 100 | 76 | 100 |
| (CH₃O)₂P(S)—O—C(CH₃)=CH—P(O)(OC₂H₅)₂ | 90 | 100 | 100 | 100 | 38 | 96 | 100 | 0 | 100 | 77 | | 100 | 100 | 92 | 0 |
| (C₂H₅O)₂P(S)—O—C(CH₃)=CH—P(O)(OC₂H₅)₂ | 100 | 100 | 100 | 100 | 99/100 | 100 | 100 | 100 | 100 | 96 | 90 | | 100 | 96 | 100/80 |
| (CH₃)₂N—P(S)(OC₂H₅)—O—C(CH₃)=CH—P(O)(OC₂H₅)₂ | 100 | 100 | 100 | 100 | 0 | 0 | 65 | 10 | 100 | 0 | | | 100 | 0 | 100 |
| CH₃O)₂P(S)—O—C(CH₃)=CH—P(O)(OCH₃)₂ | 100 | 100 | 100 | 100 | 90 | 100 | 100 | 25 | 100 | 100 | 100 | | 100 | 36 | 100 |

We claim:
1. A compound of the formula:

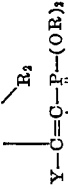

$$Y—C(Z)=C(R_2)—P(R_1)(=O)(OR)$$

(structure shown with S=P(R₁)(R₂)—O—C(Z)=C—P(=O)(OR) linkage)

wherein R is lower alkyl or allyl; $R_1$ and $R_2$ are each a (lower)alkoxy or a —N(di(lower)alkyl) substituent; Y is methyl or phenyl; and Z represents hydrogen or (lower)alkyl.

2. The compound according to claim 1: O-[2-dime-thoxyphosphinyl)-1-methylvinyl] O,O-diethyl phosphorothioate.

3. The compound according to claim 1: O-[2-(diethoxyphosphinyl)-1-methylvinyl] O,O-diethyl phosphorothioate.

4. The compound according to claim 1: O-[2-(diethoxyphosphinyl)-1-methylprpenyl] O,O-di-diethyl phosphorothioate.

5. The compound according to claim 1: O-[2-(dimethoxyphosphinyl)-1-methylvinyl] O-ethyl N,N-dimethyl-phosphoramidothioate.

6. The compound according to claim 1: O-[2-diethoxyphosphinyl) - 1 - methylvinyl] O,O-dimethyl phosphorothioate.

References Cited

UNITED STATES PATENTS 3,077,431   2/1963   Baker et al. —————— 260—972 XR

OTHER REFERENCES

Pudovik, "Chemical Abstracts," vol. 51, p. 1827 (1957).

CHARLES B. PARKER, Primary Examiner

A. H. SUTTO, Assistant Examiner

U.S. Cl. X.R.

260—946, 973; 424—204